US008849790B2

(12) United States Patent
Bellare et al.

(10) Patent No.: US 8,849,790 B2
(45) Date of Patent: Sep. 30, 2014

(54) RAPID ITERATIVE DEVELOPMENT OF CLASSIFIERS

(75) Inventors: Kedar Bellare, Amherst, MA (US); Srujana Merugu, Sunnyvale, CA (US); Sathiya Keerthi Selvaraj, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1013 days.

(21) Appl. No.: 12/344,132

(22) Filed: Dec. 24, 2008

(65) Prior Publication Data

US 2010/0161652 A1 Jun. 24, 2010

(51) Int. Cl.
*G06F 17/30* (2006.01)

(52) U.S. Cl.
CPC ...... *G06F 17/30265* (2013.01); *G06F 17/3028* (2013.01)
USPC .............. 707/708; 707/731; 707/737; 706/45

(58) Field of Classification Search
CPC ............. G06F 17/30864; G06F 17/30699; G06F 17/3071; G06F 17/30598; G06F 17/30705; G06N 99/005; G06N 5/02
USPC ............... 707/707, 708, 731, 737; 706/45
See application file for complete search history.

(56) References Cited

U.S. PATENT DOCUMENTS

| 8,095,533 B1* | 1/2012 | Ponte | 707/715 |
|---|---|---|---|
| 8,145,618 B1* | 3/2012 | Pfleger et al. | 707/708 |
| 8,554,755 B2* | 10/2013 | Richardson et al. | 707/706 |
| 8,620,909 B1* | 12/2013 | Rennison | 707/723 |
| 8,666,983 B2* | 3/2014 | Brill et al. | 707/737 |
| 2004/0002932 A1* | 1/2004 | Horvitz et al. | 706/46 |
| 2005/0154686 A1* | 7/2005 | Corston et al. | 706/12 |
| 2006/0047617 A1* | 3/2006 | Bacioiu et al. | 706/59 |
| 2006/0224579 A1* | 10/2006 | Zheng | 707/707 |
| 2007/0088686 A1* | 4/2007 | Hurst-Hiller et al. | 707/707 |
| 2008/0005091 A1* | 1/2008 | Lawler et al. | 707/707 |
| 2008/0005223 A1* | 1/2008 | Flake et al. | 709/203 |
| 2008/0005736 A1* | 1/2008 | Apacible et al. | 718/100 |
| 2008/0082466 A1* | 4/2008 | Meijer et al. | 706/12 |
| 2008/0086361 A1* | 4/2008 | Eliezerov | 705/10 |
| 2009/0063990 A1* | 3/2009 | Morris et al. | 715/751 |
| 2009/0254512 A1* | 10/2009 | Broder et al. | 707/707 |
| 2010/0082627 A1* | 4/2010 | Lai et al. | 707/738 |
| 2012/0179695 A1* | 7/2012 | Halevy et al. | 707/748 |

OTHER PUBLICATIONS

S. Godbole, A. Harpale, S. Sarawagi, and S. Chakrabarti, "Document Classification through Interactive Supervision of Document and Term Labels," in PKDD, pp. 1850196, 2004.*
Godbole, Shantanu, "Document Classification through Interactive Supervision of Document and Term Labels," PKDD, pp. 1-12, 2004.*
A. Banerjee, I. Dhillon, J. Ghosh, S. Merugu, and D. Modha, "*A Generalized Maximum Entropy Approach to Bregman Co-Clustering and Matrix Approximation,*" JMLR, 2007. to appear.

(Continued)

*Primary Examiner* — Robert Beausoliel, Jr.
*Assistant Examiner* — Alexandria Bromell
(74) *Attorney, Agent, or Firm* — Weaver Austin Villeneuve & Sampson LLP

(57) ABSTRACT

A classifier development process seamlessly and intelligently integrates different forms of human feedback on instances and features into the data preparation, learning and evaluation stages. A query utility based active learning approach is applicable to different types of editorial feedback. A bi-clustering based technique may be used to further speed up the active learning process.

23 Claims, 5 Drawing Sheets

(56) References Cited

OTHER PUBLICATIONS

S. Basu, A. Banerjee, and R. J. Mooney, "*Active Semi-Supervision for Pairwise Constrained Clustering,*" In SDM, 2004.

D. A. Cohn, Z. Ghahramani, and M. I. Jordan, "*Active Learning With Statistical Models,*" J. Artif. Intell. Res. (JAIR), 4:129-145, 1996.

S. Godbole, A. Harpale, S. Sarawagi, and S. Chakrabarti, "*Document Classification Through Interactive Supervision of Document and Term Labels,*" In PKDD, pp. 185-196, 2004.

I. Guyon and A. Elisseeff, "*An Introduction to Variable and Feature Selection,*" J. Mach. Learn. Res., 3:1157-1182, 2003.

D. D. Lewis and J. Catlett, "*Heterogeneous Uncertainty Sampling for Supervised Learning,*" In Proceedings of the Eleventh International Conference on Machine Learning, pp. 148-156. Morgan Kaufmann, 1994.

D. J. C. Mackay, "*Information-Based Objective Functions for Active Data Selection,*" Neural Computation, 4:590-604, 1992.

S. C. Madeira and A. L. Oliveira, "*Biclustering Algorithms for Biological Data Analysis: A Survey,*" IEEE Trans. Computational Biology and Bioinformatics, 1(1):24-45, 2004.

G. S. Mann and A. McCallum, "*Simple, Robust, Scalable Semi-Supervised Learning Via Expectation Regularization,*" In ICML, pp. 593-600, 2007.

H. Raghavan, O. Madani, and R. Jones, "*Active Learning With Feedback on Features and Instances,*" Journal of Machine Learning Research, 7:1655-1686, 2006.

H. S. Seung, M. Opper, and H. Sompolinsky, "*Query by Committee,*" in COLT, pp. 287-294, 1992.

S. Tong, "*Active Learning: Theory and Applications,*" PhD thesis, Stanford University, 2001.

\* cited by examiner

RAPID ITERATIVE DEVELOPMENT OF CLASSIFIERS

BACKGROUND

Automated categorization of entities into homogeneous classes based on their characteristics is a critical task encountered in numerous predictive and diagnostic applications such as web page analysis, behavioral ad targeting of users, image recognition, medical diagnosis, and weather forecasting. For example, classification of web objects (such as images and web pages) is a task that arises in many online application domains of online service providers.

Classification of web pages is an important challenge. For example, classifying shopping related web pages into classes like product or non-product is important. Such classification is very useful for applications like information extraction and search. Similarly, classification of images in an image corpus (such as maintained by the online "flickr" service, provided by Yahoo Inc. of Sunnyvale, Calif.) into various classes is very useful.

Due to its ubiquitous nature, classification has been an important topic of study in statistics, pattern recognition, AI as well as the machine learning community. The standard formulation of the classification problem involves identifying a mapping $f: \mathcal{X} \mapsto \mathcal{Y}$ between the observed properties of an entity $x \in \mathcal{X}$ and its class $y \in \mathcal{Y}$ given a collection of labeled entities following the same distribution. Over the last few decades, a number of techniques have been proposed to address this standard classification problem and variants arising due to factors such as the nature of classes (hierarchical/multi-label classification), the amount of supervision (semi-supervised/constrained classification), the space of functional mappings (decision trees, neural networks, linear classifiers, kernel classifiers), the quality of classification (misclassification error, area under ROC curve, log-likelihood, margin), and the mode of operation (batch/incremental/inductive/transductive).

Among the classification techniques described above, the most common ones are inductive classifiers that learn a "classification model" or "classifier", which can be deployed for labeling new entities. In spite of the huge diversity in the specific details of the learning algorithms, these inductive classifiers share a high-level paradigm for building classifiers, or in other words, a classifier development life cycle, that involves collection of labeled entities, designing and selecting features (or kernels) that capture the salient properties of the entities, learning a classification model over these features, and validating the learned model over a hold out set. Unfortunately, most of the research so far has focused only on a single phase of this development life cycle, i.e., learning the classification model, mostly because it is well-defined and does not involve significant human interaction. The other aspects of classifier development, i.e., data collection, feature design and validation, are relatively underexplored in academic research, and in practice, are predominantly human driven and executed in a trial and error manner that can be fairly tedious. For instance, creating a document (Y!Shopping) or image (Flickr) classifier typically involves multiple human participants, each focusing on one of the sub-tasks involved in classifier development, i.e., creating the documents/image corpus to be labeled, providing labels on the document/image corpus, designing relevant features, training, fine-tuning and evaluating the classifier. Each of these sub-tasks is repeated a large number of times in an ad hoc fashion with hardly any transfer of information across tasks, resulting in a lot of redundancy and requiring a long time to build a satisfactory classifier. Further more, the traditional form of input to the learning process consisting of labeled instances, each represented as a vector of pre-defined features is quite inefficient and ends up requiring a large number of iterations with different training samples and feature configurations. As a consequence, the overall classifier development process is quite time consuming in spite of the availability of fast learning algorithms.

SUMMARY

A method of training a classifier is such that the trained classifier is configured to map an instance to one of a plurality of classes. In one aspect, a data framework is provided corresponding to a plurality of instances and a plurality of features. A query space is provided, wherein each of a plurality of queries of the query space comprises a subset of the plurality of instances, a subset of the plurality of features and a relevant characteristic function that describes, for that query, a function of instance—feature values associated with that query and of the instance—class probabilities associated with that query, wherein the instance—class probabilities are an indication of a probabilistic model of mapping of the instances associated with the query to at least one of the plurality of classes.

An indication of commentary is received from at least one editor for each of the plurality of queries of the query space, wherein the commentary for each query being the editor's estimate of the true value of the relevant characteristic for that query and storing the estimates in the query space in correspondence with the queries. A classifier framework is configured to provide class probabilities for the instances according to a tunable parameter vector. From the classifier model, relevant characteristic values are determined corresponding to the queries in the query space.

A distortion value is determined for each query by applying a distortion function to a deviation of the classifier framework response from the indication of editorial commentary for that query. The tunable parameter vector is adjusted based on a cost function that considers a regularization component and the distortion values over the plurality of queries for which the editors gave commentary.

In one aspect, a tunable parameter vector is adjusted, based on a cost function that considers a regularization component and the distortion values over the plurality of queries for which the editors gave commentary. The class probabilities of the plurality of instances is determined and a stopping criterion function is determined. A query utility function is used to select new queries to be shown to the editor, indication of editorial commentary is received and distortion values determined. The tunable parameter vector is adjusted, and the process is iterated until the stopping criterion function goes below the stopping criterion threshold value.

DETAILED DESCRIPTION

Figure 1:
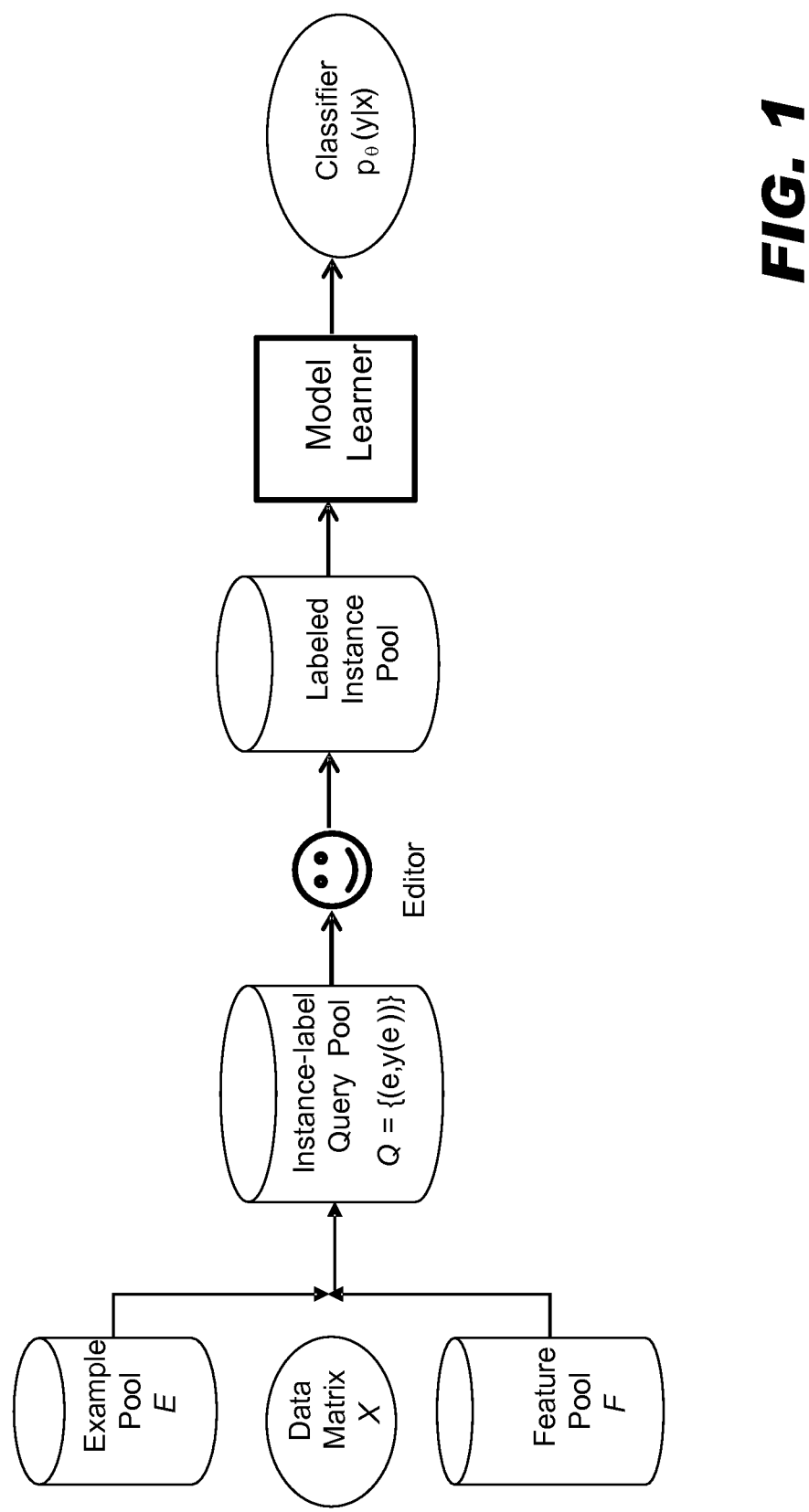
FIG. 1 is a block diagram illustrating a standard formulation of the "learning" problem to learn a classifier model.

The inventors have realized that it would be highly valuable to redesign the classifier development process so as to seamlessly and intelligently integrate different forms of human feedback into the data preparation, learning and evaluation stages. The description below herein is of a holistic approach for probabilistic classifiers, and makes, for example, three contributions. (It is noted that various references are made throughout this description. A list of the references is provided at the end.)

Multiple Forms of Editorial Feedback. A formulation is described for directly incorporating various types of supervision, e.g., class distribution over instances or any groups of instances including those determined by the presence/absence of a feature, purity of a group of instances, informativeness of a feature or a group of features, into the learning process in order to make it more efficient and eliminate multiple rounds of feature engineering.

Active Learning over Editorial Feedback. Since the classification building process is inherently iterative, an incremental active learning methodology is presented wherein a most valuable query (in terms of a well-motivated query utility criterion), which could correspond to any allowed form of editorial supervision on the existing pool of instances and features, is sequentially presented to the user to obtain feedback. The proposed methodology has a natural way of capturing the relative utility of different forms of feedback (e.g., class distribution of an example vs. informativeness of a feature) as well as the specific value of instances and feature. It is also amenable to scenarios where the training and test distributions are significantly different.

Faster Pool-based Active Learning via Biclustering. Lastly, we propose a technique for simultaneous bi-clustering and classification of features and instances in order to improve the diversity of the editorial queries as well as reduce the size of the query pool, both of which in turn further speed up the classifier learning.

The remainder of this patent description is organized as follows. First, a description is provided of related work on feature engineering, expectation regularization, and active learning. Next, an introduction is provided of the general inductive classification problem as well as the specific instantiation in case of a multinomial logit model. Next, a methodology is described for incorporating different forms of editorial feedback into the learning process. Next, a query utility criterion (information-gain) based active learning approach is described, that is applicable to different types of feedback, and the last section describes a bi-clustering based technique for further speeding up the active learning process.

Now, discussing related work, it is noted that the current work is closely tied to a few other areas of research namely, feature engineering [9], expectation regularization [13] and active learning [16]. Feature engineering refers to the design, transformation and selection of observed properties of instances that are highly predictive of the associated classes. In the past, there has been considerable work on selecting a highly predictive subset of features from a given pool based on criteria such as correlation and information-gain in order to maintain high accuracy, reduce classification time and prevent over-fitting. A number of techniques have also been proposed for creating a new reduced set of features corresponding to linear combinations or aggregations of the original features using matrix factorization and clustering. Guyon et al. [9] provides an extensive survey of the state-of-art feature selection and transformation techniques. Recently, Raghavan et al. [14] and Godbole et al. [8] proposed an interactive methodology that directly incorporates editorial supervision on the relevance of features in addition to performing data-driven feature selection. The proposed approaches, however, treat the editorial relevance feedback as absolute and only use the human selected features for learning the model.

Expectation regularization is a semi-supervised learning method proposed by Mann et al [13] that involves augmenting the traditional data-likelihood objective function in probabilistic classifiers with an additional term that incorporates editorial knowledge in the form of expectations on various data properties, e.g., class priors, marginal class distributions on certain groups of instances. Specifically, this additional term is a penalty determined by the deviation of the model predictions from the user expectations. Druck et al. studied a particular instantiation of this approach where the user specified expectations correspond to marginal class distributions over the set of all instances that contain a particular binary feature. Unlike previous works [14,8] that focus on the relevance of a particular feature for prediction purpose, this form of supervision can be viewed as associating a class distribution with a feature and was shown to be highly effective for text classification. Our current work builds on this approach and extends it to a broader framework for editorial supervision, that also captures feature relevance feedback.

Active learning techniques, where the learning algorithm explicitly queries the editor about specific instances, have become an important area of research due to the increasingly large scale nature of prediction problems and the enormous human effort required in providing supervision. Among the existing approaches for classification, prominent ones involve greedy pool-based learning, where the active learner repeatedly picks the best instance to be labeled from a pre-specified pool of unlabeled instances depending on the learner's current estimate of their potential "informative value." A number of different criteria have been proposed for quantifying the "informative value" of an unlabeled instance. Lewis et al. [10] introduced uncertainty sampling where the best instance is the one that the current classifier is most uncertain about. This uncertainty is quantified by the entropy of the predicted class distribution in case of probabilistic classifiers and by the margin in case of margin-based classifiers. Query-by-committee approaches [15] form a second class of approaches, which assume a prior distribution over the classifier space (hypothesis space) and quantify the informative value of an instance in terms of the degree of disagreement among a small set of classifiers sampled from the assumed prior distribution. This class of approaches is more natural for parametric Bayesian classifiers where it is possible to specify and sample from a prior distribution in a tractable manner. A third class of approaches involve choosing instances that directly optimize a particular quality of the learned classifier (or distribution there of), such as the statistical variance or bias. These include active regression techniques proposed by Cohn et al. [7] that attempt to optimize the squared error loss of the model, as well as information-theoretic based methods studied by Mackay [11]. Tong's thesis [16] on active learning provides a detailed survey of most of the existing approaches and related topics. Our current work is a generalization of these active learning approaches, and the query pool is not limited to instance labels but, rather, includes all the allowed forms of editorial supervision.

We now discuss probabilistic classification, including the standard inductive classification problem, focusing on probabilistic classifiers. The inductive classification problem can be divided into two phases—learning (training) and inference (prediction). In the training phase, given a collection of instances (typically assumed to be i.i.d.) and the class labels associated with some of them, one learns a classifier, which is then used in the prediction phase to classify the unlabeled instances. Probabilistic classifiers form a special class of techniques where the classifier is typically a parametric model and the act of classifying an instance involves estimating the conditional probability of the class given the observed properties. There also exist a number of other classification techniques such as decision trees and support vector machines [3] that do not yield class probabilities. The techniques proposed in the current work, however, are directly applicable only for probabilistic classifiers and hence, we will restrict ourselves to this class of classifiers in the rest of the write-up. Even with non-probabilistic approaches such as decision trees and support vector machines, if class probabilities can be formed in a post-processing step, then our methods are applicable to these approaches as well. Furthermore, among the two phases, the learning phase is the often the critical time consuming one requiring multiple iterations of fine-tuning with human interaction whereas the inference phase is typically fully automated and fast.

Hence, we will focus on the learning phase. But, first, we discuss problem formulation. In particular, let $\epsilon = \{e_1, \ldots, e_i, \ldots, e_n\}$ denote the set of instances sampled (i.i.d., that is, independently and identically distributed) from an underlying population and $\mathcal{F} = \{f_1, \ldots, f_j, \ldots, f_m\}$ the set of observed properties or features associated with each of these instances. Further, let $x_{ij}$ denote the value of the $j^{th}$ feature ($f_j$) of the $i^{th}$ instance ($e_i$) and the range of $x_{ij}$ depends on the nature of the feature $f_j$, i.e., whether it is binary/category/real-valued, etc. Associated with each instance $e_i$, there also exists a unique (possibly unknown) class label $y(e_i) = y_i$ from a discrete set $\mathcal{Y} = \{c_1, \ldots, c_k\}$. To keep the problem formulation simple, we assume that the feature set $\mathcal{F}$ (including linear combinations, products, conjunctions, etc.) is discrete and completely specified before hand, and also that the class labels are exclusive with no dependencies (e.g., unlike in hierarchical classification) though it is possible to extend our approach to more general scenarios without these constraints.

First, we consider a standard formulation of the learning problem, as illustrated in FIG. 1. In particular, referring to FIG. 1, given a pool of instances $\epsilon$, a pool of features $\mathcal{F}$, the data matrix X, a parametric family of conditional distributions $\{p_\theta(y|x)|\theta\in\Theta\}$ (where $x_i=[x_{i1}, \ldots, x_{im}]$ denotes the entire feature vector associated with $e_i$), and editorial supervision in the form of class labels for a subset of the instances $\epsilon_{lab}$, i.e., $S = \{(e_i, y_i) | e_i \in \epsilon_{lab}\}$, the "best" parameter choice $\theta^*$ is determined that optimizes a suitable classifier quality criterion $J(\cdot)$ of all the available information, $$\theta^* = \underset{\theta \in \Theta}{\operatorname{argmax}} J_{\mathcal{E},\mathcal{F},X,S}(\theta).$$

Here, $J(\cdot)$ is typically chosen to be the conditional data likelihood along with regularization terms arising from prior distribution on the parameter space $\Theta$. The above formulation corresponds to a passive learning scenario where learning takes place in a batch mode and there is no interaction with the editor once the supervisory information S has been provided. Furthermore, each unit of supervision takes the specific form of instance and class label pair (e, y(e)).

The description herein is of generalizing the known formulation in three main areas.

Query Space-Forms of Supervision. First, the editorial supervision may be represented as a set of information units, each of which corresponds to a query-answer pair, i.e., $$S = \{s | s = (q, a(q)), q \in Q_{ask} \subset Q\}, \quad (1)$$

where s denotes a unit of supervision, q a query, a(q) the correct response and Q, $Q_{ask}$ respectively denote the entire space of allowed queries and the ones actually asked. In the standard formulation, the only allowed form of supervision is providing the label for a particular instance. Hence, there is a 1-1 mapping between the space of allowed queries Q and the pool of instances $\epsilon$ and the answer to a query associated with an instance is its true label. We provide a new broader definition for the query space Q and the possible forms of supervision.

Classifier Quality Criteria. As mentioned earlier, the quality criterion $J(\cdot)$ in the standard formulation, is typically chosen based on the data likelihood. This choice is natural given only knowledge of the instance labels, but may not be adequate when the supervisory information takes other forms, e.g., class purity of a group of instances. To address this, we also describe a well-behaved family of classifier quality criteria to apply to the new query space and which can also be optimized in a fairly scalable manner (discussed later).

Query Utility Criteria. In addition, the standard formulation described above assumes a passive batch mode where the learning phase itself can be clearly divided into two separate phases: (i) editor providing supervision S, and (ii) learner estimating the optimal parameter $\theta^*$ given all the information. In an improved formulation, the learning process is treated as an iterative loop between the two phases where the query (or queries) posed to the editor at each iteration may depend on all the information available so far. Generally, only a limited number of queries are posed in a single iteration, a generic query utility criterion is determined that is applicable to the new query space, besides providing other benefits as discussed below.

Figure 2:
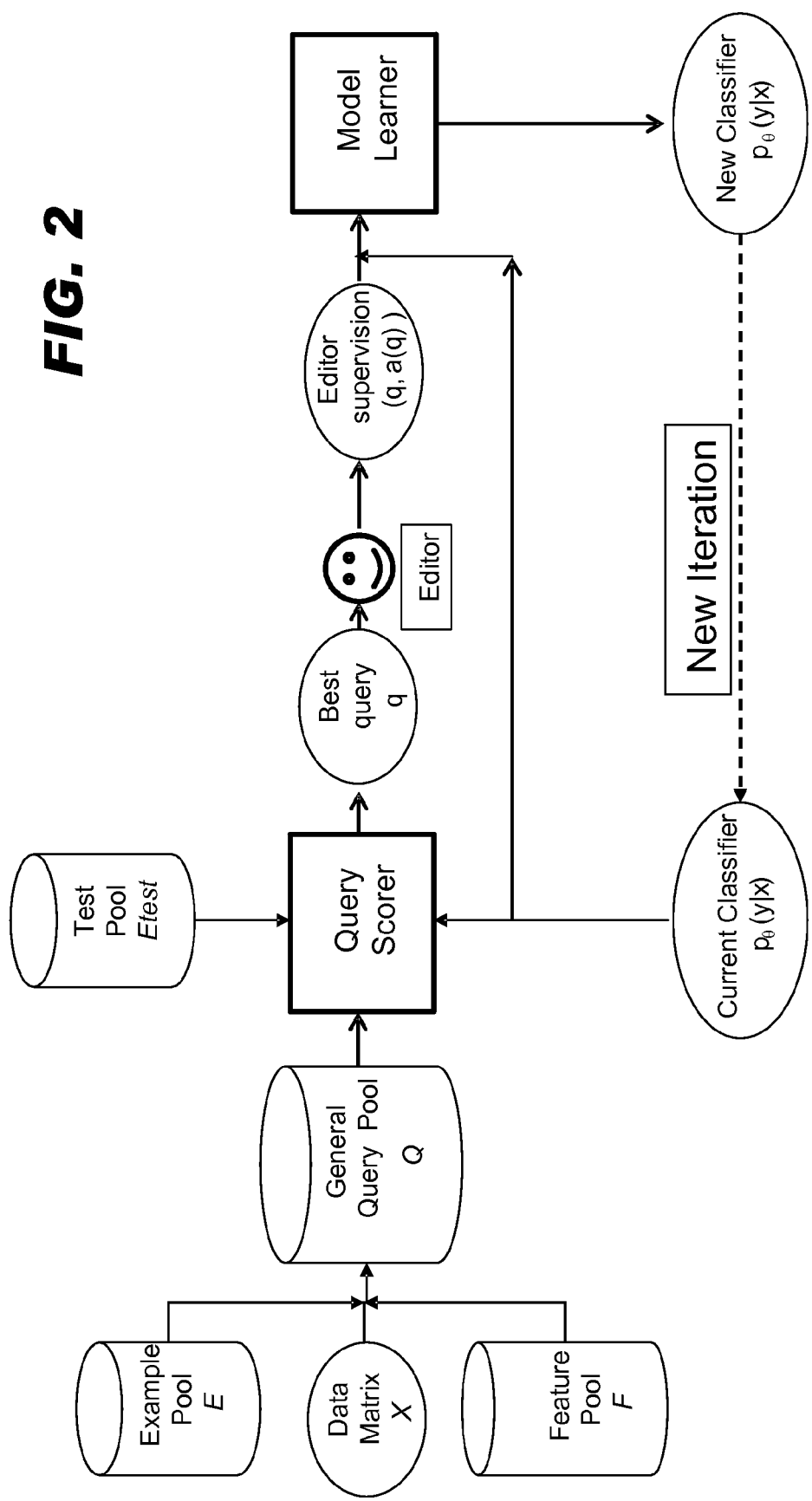
FIG. 2 is a block diagram illustrating a formulation of the "learning" problem using active iteration with editorial feedback.

We now turn to FIG. 2, which illustrates an iterative formulation and involves solving two sub-problems corresponding to the model-learner and query-scorer.

Model Learning. Given a pool of instances $\epsilon$, a pool of features $\mathcal{F}$, the data matrix X, a parametric family of conditional distributions $\{p_\theta(y|x)\theta\in\Theta\}$ (where $x_i=[x_{i1}, \ldots, x_{im}]$ denotes the entire feature vector associated with $e_i$), and editorial supervision in the form of class labels for a subset of the instances $\epsilon_{lab}$, i.e., $S = \{(e_i, y_i) | e_i \in \epsilon_{lab}\}$, the "best" parameter choice $\theta^*$ is determined so as to optimize a suitable classifier quality criterion $J(\cdot)$ of all the available information, $$\theta^* = \underset{\theta \in \Theta}{\operatorname{argmax}} J_{\mathcal{E},\mathcal{F},X,S}(\theta).$$

Query Scoring. Given a pool of queries Q defined in terms of the instance pool $\epsilon$, feature pool $\mathcal{F}$ and the data matrix X, editorial supervision S over previously asked queries $Q_{ask}$, the current classifier $p_{\theta^*}(y|x)$, and a suitable query utility criterion $V(\cdot)$ (which also depends on the parametric classifier family), a query q* is determined that provides the maximum utility, i.e., $$q^* = \underset{q \in Q \cup \{q_{ax}\}}{\arg\max} V_{\theta^*, \mathcal{E}, \mathcal{F}, X, S}(q).$$

It should be noted that this formulation can also be posed in terms of a fixed number of queries instead of a single one.

Multiple Forms of Supervision We now discuss incorporating multiple forms of supervision. In this section, we first provide a formal definition of the proposed query pool, which determines the possible forms of supervision and show how most of the intuitive forms of editor feedback on feature relevance, cluster purity, class distributions turnout to be special cases. We then describe classifier quality criteria that ensure that the learned model is faithful to the editorial supervision and discuss algorithms for optimizing these criteria.

Editorial Query Space With regard to an editorial query space, given a collection of instances $\epsilon$, features $\mathcal{F}$ and the corresponding data matrix X, an intuitive as well as visually appealing way of providing supervision is to comment about the "characteristics" of a block in the matrix determined by a subset of the instances $\epsilon' \subset \epsilon$ and features $\mathcal{F}' \subset \mathcal{F}$. (Assuming the rows and columns of the matrix are reordered, any sub-matrix can be represented as a block.) In this case, supervision about a particular instance may correspond to a single row block spanning all the columns while that on a feature may correspond to a single column spanning all the rows. In general, the relevant "characteristics" for identifying a functional mapping from x to y may be functions of the variables $\{x_{ij}|e_i \in \epsilon', f_j \in \mathcal{F}_q\}$ and $\{y_i|e_i \in \epsilon'\}$. Since in the currently-described scenario, the classifier to be learned is assumed to yield class probabilities, i.e., p(y|x), it is assumed that the relevant "characteristics" are functions of the instance-feature values $X_{\epsilon', \mathcal{F}'} = \{x_{ij}|e_i \in \epsilon', f_j \in \mathcal{F}'\}$ and the instance-class probabilities $P_{\epsilon'} = \{p_i|p_{ik} = Pr(y_i = c_k), e_i \in \epsilon'\}$. Under this definition, each query q has three components:

instance set $\epsilon_q \subset \epsilon$ feature set $\mathcal{F}_q \subset \mathcal{F}$ function form of the relevant characteristic $r_q(X_{\epsilon_q, \mathcal{F}_q}, P_{\epsilon_q})$ In other words, the query space can be defined as $Q = 2^{\epsilon} \times 2^{\mathcal{F}} \times \mathcal{R}$ where $\mathcal{R}$ is the set of relevant characteristic functions.

For each query $q = (\epsilon_q, \mathcal{F}_q, r_q(\cdot)) \in Q$, the editorial "answer" a(q) corresponds to the true value of the function $r_q(\cdot)$ evaluated on $\epsilon_q, \mathcal{F}_q$. One might also optionally assume that the editor can provide a non-negative relative importance score $w_q$ for each query so as to influence the desired level of model fidelity with respect to the different parts of editorial supervision. Such a relative importance score may be taken into account with respect to editorial confidence as well as the size of the instance space being affected by the query.

Figure 3:
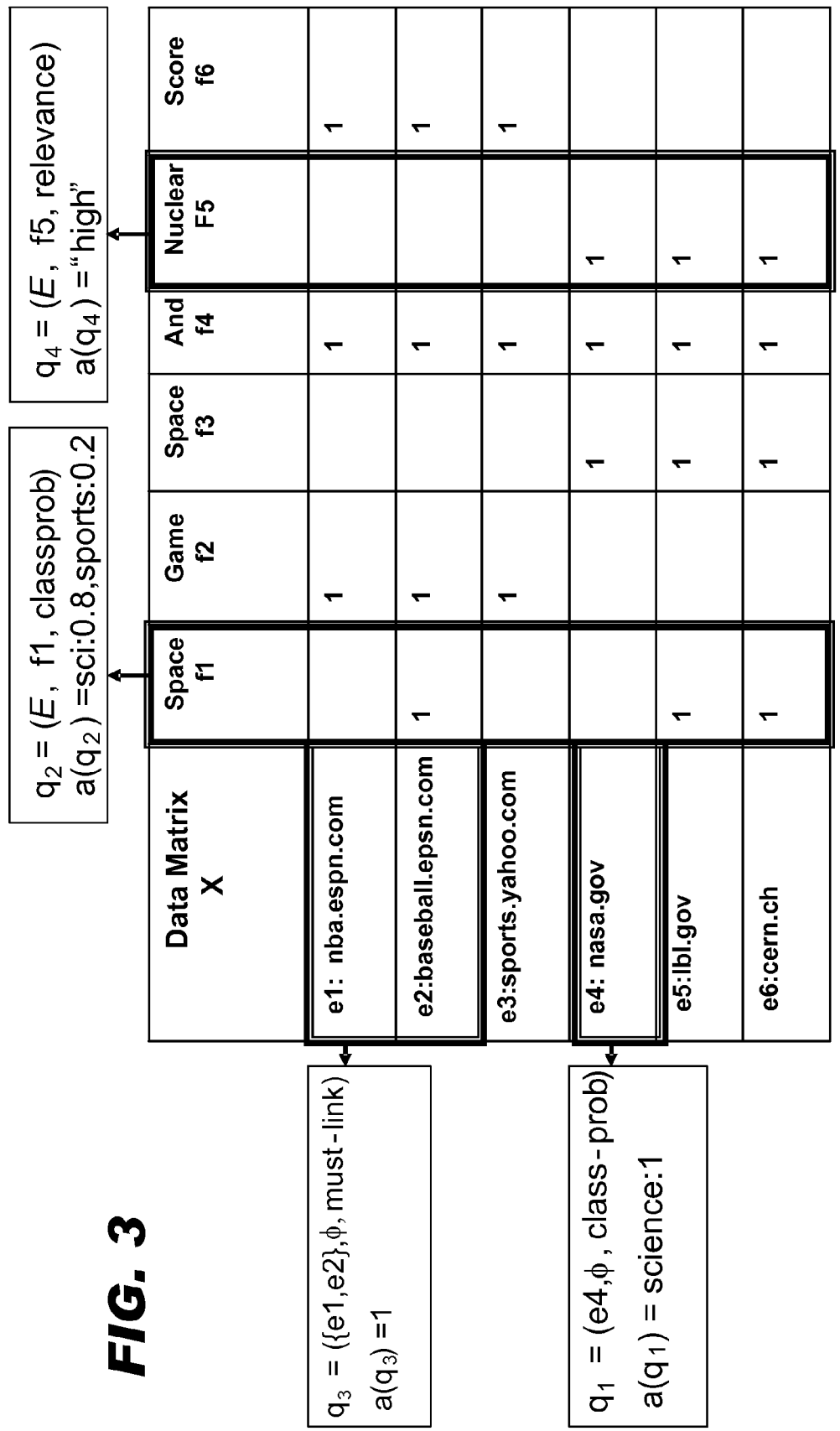
FIG. 3 illustrates a data matrix of instances and features, and further illustrates common forms of editorial supervision with respect to the data matrix.

We now discuss special cases, with reference to FIG. 3 and discussion of common forms of supervision. In particular, we discuss how some of the common forms of editorial knowledge can be represented using the described query representation. For the sake of illustration, we consider the concrete example of learning a classifier that distinguishes between science and sports websites given six web page instances and a feature pool corresponding to a vocabulary of six words, as shown in FIG. 3.

Instance Labels. This is the only supervision supported in the standard formulation and corresponds to the type of supervision $q_l$ in FIG. 3 whereas webpage (nasa.gov) is labeled as a science webpage with probability 1. In this case, the instance set $\epsilon_q$ is a singleton set $e_i \in \epsilon$, the feature set $\mathcal{F}_q$ is the null set and the relevant characteristic $r_q(\cdot)$ is just the class distribution $p_i$ associated with that particular instance. This representation subsumes the case where a unique class label is provided for each instance instead of a distribution.

Marginal Class Distribution Based on Features. Druck et al. propose that knowledge of marginal class distribution over a subset of examples that contain a particular binary feature can be highly informative. In FIG. 3, this form of supervision is illustrated by $q_2$, which states that webpages containing the word spin are likely to be related to science with probability 0.8 and sports otherwise. Under the proposed query representation, such feedback corresponds to the case where $\epsilon_q = e_i | x_{ij} = 1, e_i \in \epsilon$ such that $f_j \in \mathcal{F}$ is the binary-valued feature of interest, $\mathcal{F}_q$ is the empty set and the relevant characteristic function $$r_q(X_{\epsilon_q, \mathcal{F}_q}, P_{\epsilon_q}) = \sum_{i|e_i \in \epsilon_q} p_i.$$

One can readily generalize this form of feedback by allowing a wider range of choices for the instance set $\epsilon$, for example in terms of constraints involving multiple features and their values.

Pairwise Constraints. There has also been work [2] incorporating "must-link" and "cannot-link" constraints into the learning process. For instance in FIG. 3, supervision on $q_3$ insists that the webpages baseball.espn.com and nba.espn.com should both be of the same class without explicitly specifying the class label. This scenario corresponds to a case where the instance set is a pair, i.e. $\epsilon_q = \{e_i, e_j\} \subset \epsilon$, with a null feature set, i.e., $\mathcal{F}_q = \emptyset$ and the relevant characteristic function measures a suitable divergence metric $d(\cdot)$ in the class distributions of the two instances, i.e., $$r_q(X_{\epsilon_q, \mathcal{F}_q}, P_{\epsilon_q}) = d(p_i, p_j).$$

This form of feedback can also be extended to instance sets of size greater than two with the characteristic function $r_q(\cdot)$ redefined as the average pair-wise divergence within the group in order to capture information about the relative purity of an instance cluster.

Feature Relevance. Feature engineering is predominantly driven by editorial input on whether a feature is predictive or not. This is illustrated by $q_4$ in FIG. 3 that states that the presence of the word nuclear is highly predictive of the class label. This form of input corresponds to a query with the instance set $\epsilon_q \subset \epsilon$, a singleton feature set containing the relevant feature, i.e., $\mathcal{F}_q = \{f_j\} \subset \mathcal{F}$ and a relevant characteristic function that captures the correlation with the class labels and the $j^{th}$ feature values over the entire instance space. An example of such function is the conditional entropy function, i.e., $r_q(X_{\epsilon_q, \mathcal{F}_q}, P_{\epsilon_q}) = H(y|X_{f_j})$ where y and $X_{f_j}$ are respectively random variables taking values over the class labels and the $j^{th}$ feature values for all the instances in $\epsilon_q$.

We now discuss classifier quality and parameter estimation, considering mechanisms to incorporate the available editorial input into the model learning process. As mentioned earlier, a classifier quality criterion $J(\cdot)$ is designed that captures how much the model predictions deviate from information specified by the editor.

Assuming that the queries posed to the editor provide independent information and that one also has access to the relative importance of each query in terms of non-negative weights, the most natural quality function is just a weighted aggregation of the classifier quality with respect to each query answered by the editors, i.e., $$J_{\mathcal{E},\mathcal{F},\mathcal{X},\mathcal{S}}(\theta) = \sum_{q \in \mathcal{Q}_{ask}} w_q J_q(\theta) + g(\theta),$$

where $J_q(\theta)$ specifically quantifies how much the predictions of the parametric classifier $p_\theta(y|x)$ differ from the editorial response to the query q and $g(\theta)$ is a regularization term associated with some prior distribution on $\theta$. In the absence of editor provided weights, an alternate strategy is to assume uniform weights across homogeneous groups of query and determine these weights via cross-validation.

Let $\mathcal{A}_q$ denote the space of possible responses to query q and $d_q(\cdot,\cdot): \mathcal{A}_q \times \mathcal{A}_q \mapsto \mathbb{R}$ be any real-valued function that measures the divergence between two responses to the query. The query-specific quality function can then be expressed as $J_q(\theta)=d_q(a(q),a_\theta(q))$ where $a(q)$ is the editorial response to query q and $a_\theta(q)$ is the response predicted using the model $p_\theta(y|x)$. By definition, the response to a query $q=(\epsilon_q, \mathcal{F}_q, r_q(\mathcal{X}_{\epsilon_q,\mathcal{F}_q}, \mathcal{P}_{\epsilon_q}))$ is the value of the characteristic function $r(\cdot)$, and hence the model prediction $a_\theta(q)$ can be obtained readily by replacing all the $p_i(e_i \epsilon \epsilon_q)$ by $p_\theta(y|x_i)$.

The overall classifier quality, in this case, is given by $$J_{\mathcal{E},\mathcal{F},\mathcal{X},\mathcal{S}}(\theta) = \sum_{q \in \mathcal{Q}_{ask}} w_q d_q\Big(a(q), \big(\mathcal{X}_{\epsilon_q,\mathcal{F}_q}, \mathcal{P}_{\epsilon_q,\theta}\big)\Big) + g(\theta),$$

where $\mathcal{P}_{\epsilon_q,\theta}$ denotes the class probabilities of all the instances in $\epsilon_q$.

From the discussion above, it is noted that learning the model involves optimizing the classifier quality function over the parameter space $\Theta$. Hence, the tractability of this learning problem may depend heavily on the choice of the parametric model $p_\theta(y|x)$, the query characteristic function $r_q(\cdot)$ and the divergence function $d_q(\cdot,\cdot)$. When these functions are chosen so that $a_\theta(q)$ is convex in $\theta$ and $d_q(\cdot,\cdot)$ is convex in its second argument, then the classifier quality criterion is guaranteed to be convex over the parameter space and the model learning problem, and the learning model reduces to a standard convex optimization problem that can be solved using a variety of algorithms [4]. Even in case the quality function $J(\theta)$ turns out to be non-convex, one can often adopt an alternate optimization approach [5] by decomposing the original problem into sub-problems each of which is either convex or exactly solvable.

We now discuss a multinomial logit example. In particular, to illustrate the general methodology, we consider an example involving multinomial logit model over K classes. The parametric model in this case is given by $$p_\theta(y = c_k | x) = \frac{\exp(\theta_k^t x)}{\sum_{k'=1}^{K} \exp(\theta_{k'}^t x)}.$$

When the supervision is only in the form of instance labels (i.e., $\epsilon_q = e_i, \mathcal{F}_q = \emptyset, r_q(\cdot) = p_i$), the model predictions for the query response are $a_\theta(q) = p_\theta(y|x_i)$, i.e., just the conditional probability distribution. Assuming the queries are all equally important (say $w_q = 1$) and the divergence measure $d_q(\cdot,\cdot)$ is KL-divergence, the classifier quality function reduces to the conditional log-likelihood of the labeled data, i.e., $$J_{\mathcal{E},\mathcal{F},\mathcal{X},\mathcal{S}}(\theta) = \sum_{i|e_i \text{ is labeled}} KL(p^{editor}(y_i), p_\theta(y|x_i)) = -\sum_{i|e_i \text{ is labeled}} \log p_\theta(y_i^{editor}|x_i).$$

where $y_i^{editor}$ is the editorial label for instance $e_i$ and the $p^{editor}(y_i)$ the corresponding degenerate distribution. This above cost function is convex in $\theta$ and there exist a number of efficient algorithms [3] exist for determining the optimal choice of $\theta$.

Active Learning Over Editorial Feedback We now discuss active learning over editorial feedback. We describe various types of queries that can be scored in an equitable fashion using a query utility based criterion so as to obtain maximum value from the editorial feedback.

We consider the scenario where the learning approach is an iterative process where each iteration involves an editor responding to a particular query q followed by a model learning or parameter estimation step. The model learning step should take into account all the available supervision and estimate the best possible parameters.

We now discuss a query utility criterion. In the sequential active learning framework described above, the utility of the unanswered queries in the query space $\mathcal{Q}$ is to be evaluated so as to pose the best one to the editor. One approach for quantifying the value of a query is targeted towards reducing the statistical variance in the model predictions (which is highly suitable for unbiased learners) and is closely related to earlier work by Mackay [11] and Cohn et al. [7]. Specifically, we define the utility of a query as the expected reduction in the uncertainty of the model predictions over the test set of instances. Since the current degree of uncertainty is independent of the queries, the query utility is essentially negatively related to the expected uncertainty of the new model predictions. The expectation in this case is taken over different possible editorial responses to the query, which are assumed to follow the current best choice of the parametric classifier. Further, we choose to measure the uncertainty of the model predictions in terms of the entropy of the conditional distribution of the class label of each instance in the test set.

Let $\epsilon_{test}$ denote the test set of instances. Then, the utility of an unanswered query q is given by $$V(q) = -E_{a(q) \sim p(a_{\theta^*}(q))} \left[ \sum_{i|e_i \in \epsilon_{test}} H(p_{\theta_{new}^*(q,a(q))}(y|x_i)) \right],$$

where the response to the query $a(q)$ is assumed to follow the distribution determined by the current parameter estimates $\theta^*$ and $\theta_{new}^*(q, a(q))$ is the new optimal parameter estimate given $(q, a(q))$. Given the specific form of the conditional distribution $p_\theta(y|x)$ and the incremental parameter update equation, one can further simplify the query utility function.

Unlike straightforward instance or feature uncertainty based criteria, the above utility criterion is applicable to all the different types of queries described earlier (e.g., feature relevance feedback, instance labels) and provides a unified framework for comparing their relative values. Further more, defining the utility criterion in terms of the model usage, (predictions on the test set), allows one to efficiently tailor the feedback collection process to obtain better accuracy for the relevant prediction task, which is not possible using other techniques. Adopting a naive query scoring process at each stage of iteration can, however, require significant computational resources since the query space is typically large and the utility function is relatively complex as well.

Faster Pool-Based Active Learning via Biclustering We now discuss a faster pool-based active learning method, via bi-clustering. As discussed earlier, a brute-force approach to evaluating the utility of each potential query can be computationally very expensive when the number of instances (train/test) and/or features is large, such as due to two main reasons. One reason is the large size of the resulting query space $Q$ even for a limited set of characteristic functions, since it is defined in terms of the cross product of the power sets of instance and feature pools. Secondly, the computation of the query utility criterion also involves estimating the model predictions for each of instances in the test set.

To address this issue, we describe a clustering approach that coarsens the instance and feature space by simultaneous grouping of instances and features into a small number of instance and feature clusters. A key idea is that if the instance and feature clusters are homogeneous with respect to the dependency of the instance class assignments on the instance-feature values, then it is sufficient to provide feedback over the instance/feature clusters instead of individual instances or features. This cluster "homogeneity" enables us to construct a much smaller, but diverse subset of the query space, which heavily reduces the query evaluation time. Further more, clustering the test instance set also enables one to approximate the query utility criterion by computing the model predictions over test instance clusters instead of the individual instances.

Figure 4:
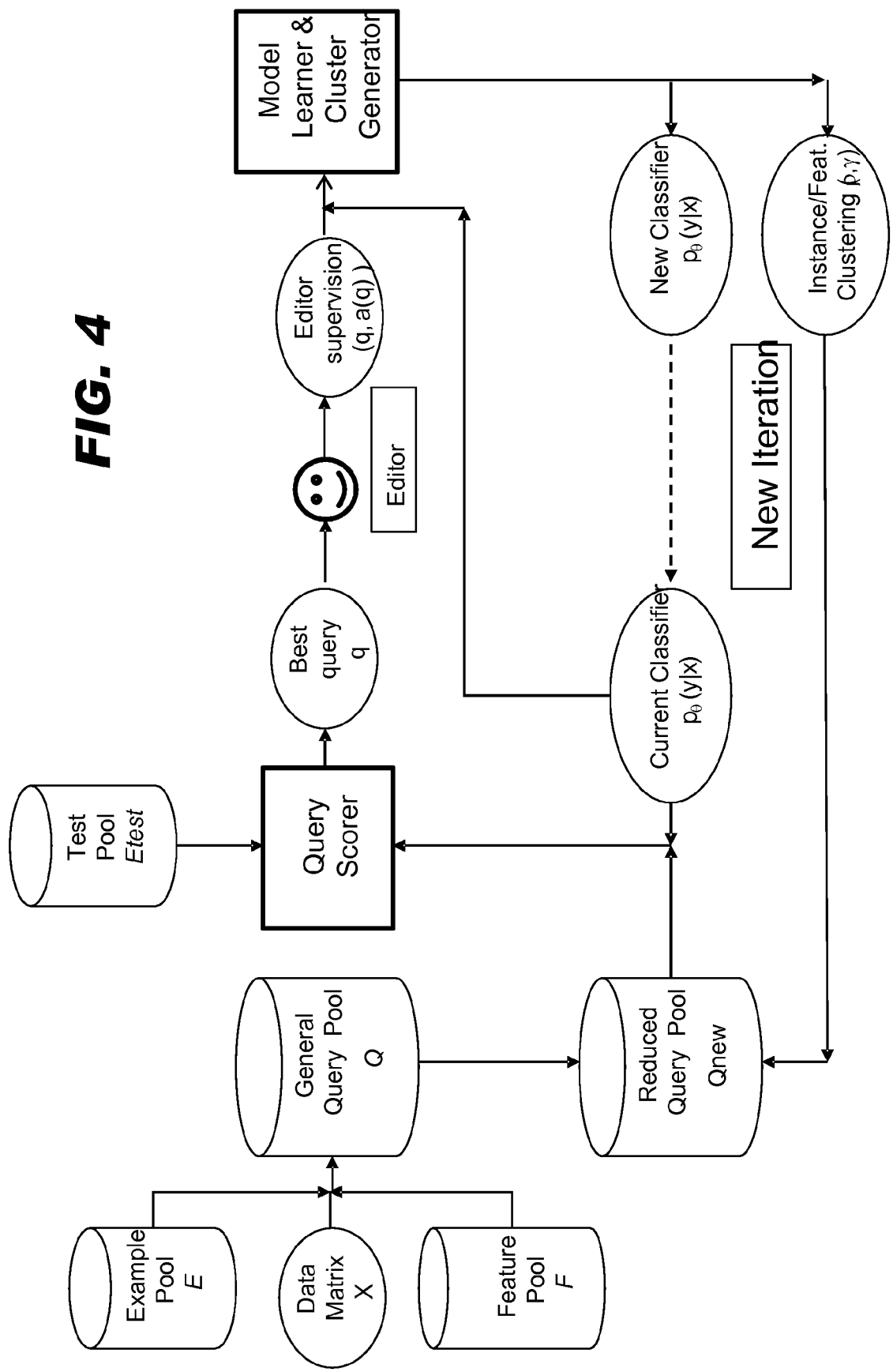
FIG. 4 illustrates a scenario in which clusters are utilized to limit the query space and the query utility function may be approximated using test instance clusters.

In one example, there are three keys steps in the proposed methodology. The first step deals with the identification of the instance and feature clusters, which is done as part of the classifier training. The second step involves using the clusters to limit the query space and the third step is related to the approximation of the query utility function using the test instance clusters. FIG. 4 illustrates an iterative classifier development process for this scenario.

We first discuss obtaining instance and feature clusters. In particular, we seek a partitioning of instance and feature space such that all the instances (features) within an instance (feature) cluster have a similar feature (instance) values and class labels. To identify the "best" choice of instance and feature clustering, one needs to specify the family of clusterings being considered as well as to quantify the goodness of each clustering, or in other words, the overall similarity within the instance and feature clusters. For computational efficiency, we only consider disjoint partitionings into a pre-specified number of instance and feature clusters.

Let $\rho: \epsilon \mapsto \{1, \ldots k\}$ and $\gamma: \mathcal{F} \mapsto \{1, \ldots l\}$ map the instance and feature pool to k and l clusters, respectively. To quantify the goodness of the bi-clustering $(\rho, \gamma)$, we consider a low parameter approximation $\hat{x}$ that is defined in terms of $(\rho, \gamma)$ and the original data matrix x so as to be homogeneous (either directly in terms of data values or trends). An important example is the case where $\hat{x}_{ij}$ is the mean of the bi-cluster that $(e_i, f_j)$ belong to, i.e., $$\hat{x}_{ij} = \frac{\sum_{e_{i'}:\rho(e_{i'})=\rho(e_i)} \sum_{f_{j'}:\gamma(f_{j'})=\gamma(f_j)} x_{ij}}{|\{e_{i'}:\rho(e_{i'}) = \rho(e_i)\}||\{f_{j'}:\gamma(f_{j'}) = \gamma(f_j)\}|}.$$

If the bi-clustering was indeed such that the mapping between the instance feature values and the labels is similar within the bi-clusters, then one would expect the low parameter approximation $\hat{X}$ to be fairly predictive of the label space as well. Hence, we define the combined quality of the classifier parameters $\theta$ and the bi-clustering $(\rho, \gamma)$ as $$J^{new}_{\mathcal{E},\mathcal{F},\mathcal{X},S}(\theta,\rho,\gamma) = J_{\mathcal{E},\mathcal{F},\hat{X}(\rho,\gamma,X),S}(\theta).$$

where $\hat{x}(\rho, \gamma, x)$ is the low parameter approximation of the data matrix and $J_{\mathcal{E},\mathcal{F},\mathcal{X},S}(\bullet)$ is the classifier quality function described above. Note that different choices of $\hat{X}$ (e.g., based on most frequent data value or additive trends across features/instances in a bi-cluster) lead to different quality clustering criteria.

As shown in FIG. 4, the model learning problem now involves optimizing over both the classifier parameters and the bi-clustering, i.e., $$(\theta^*, \rho^*, \gamma^*) = \underset{(\theta,\rho,\gamma)}{\operatorname{argmax}} J^{new}_{\mathcal{E},\mathcal{F},\mathcal{X},S}(\theta, \rho, \gamma).$$

A typical solution for addressing this problem is via alternate optimization [5], which is an iterative procedure where at each step, one of the arguments is optimized keeping all the others fixed. When the objective function is separable in terms of the instances (features), the instance (feature) clustering can be optimized by separately choosing the best assignment for each of the instances (features) leading to a highly efficient clustering algorithm. There also exist a number of other bi-clustering algorithms [12,1] that can be used along with the classifier parameter estimation to determine the best choice of the clustering and the classifier.

We now discuss constructing a reduced query space. In particular, given a bi-clustering $(\rho, \gamma)$ of the instance and feature pools, we define a new query space $Q_{new} \subset Q$ (as described in the section above entitled "Editorial Query Space") as the set of all queries $q \subset Q$ such that the instance subset $\epsilon_q$ and the feature subset $\mathcal{F}_q$ associated with the query can be expressed as union of the instance clusters and feature clusters respectively, i.e., $$Q_{new} = \{q \in Q | e_i \in \epsilon_q \Rightarrow e_{i'} \in \epsilon_q, \forall e_{i'}, \rho(e_{i'}) =$$
$$\rho(e_i) \lor f_j \in \mathcal{F}_q \Rightarrow f' \in \mathcal{F}_{q_q}, \forall f_{j'}, \gamma(f_j) = \gamma(f_j)\}.$$

This choice of query space may be thought of as being effectively equivalent to choosing the instances and features at the coarser cluster level. Hence, for a particular choice of relevant characteristic function $r_q(\bullet)$ (as described in the section above entitled "Editorial Query Space"), the number of possible queries is given by the cardinality of the cross product of the power sets of the instance and feature cluster sets, i.e., $2^{k+l}$ instead of $2^{m+n}$ (where m and n refer to the number of instances and features in $\epsilon$ and $\mathcal{F}$ respectively). Since the number of instance and feature clusters (k,l) is likely to be much smaller than the size of the original instance and feature pool, evaluating all the queries in $Q_{new}$ requires significantly less computational time and resources than in the basic approach described above. Furthermore, since any pair of queries with the same relevant characteristic function, differ substantially either on the instance subset or the feature subset, there is less redundancy in the editorial feedback further speeding up the classifier development.

We now discuss an approximation for the query function. In particular, given the new query space $Q_{new}$ one still needs to compute the query utility function for each member query $q \in Q_{new}$ in order to identify the best query (queries) to be presented for editorial feedback.

As mentioned above, the query utility function may be defined in terms of the expected reduction in the uncertainty over the classifier predictions on the test instance set. Since the test instance $\epsilon_{test}$ itself can be fairly large, this computation can be fairly expensive. In an example of simplifying this computation, we first map the instances in the test set $\epsilon_{test}$ to the k generated instance clusters. There are two possible scenarios:

Case 1: Test instance set is a not subset of the instance pool used for clustering, i.e., there exists at least one test instance $e \in \epsilon_{test} \backslash \epsilon$. To assign these new test instances to the existing clusters, we first construct feature vectors $\hat{x}_1, \ldots, \hat{x}_k$ for each of the instance clusters based on the low parameter approximation of the data matrix $\hat{x}$ as follows:

$$\hat{x}_g = [\hat{x}_{i_1}, \ldots, \hat{x}_{i_n}] \text{ for any } e_i \text{ s.t. } \rho(e_i) = g.$$

The similarity between the feature vector x(e) associated the instance e and the cluster feature vectors is measured using a pre-specified distortion (or similarity) measure d(•,•) (It is noted that this distance metric is different from the one discussed above), and each new instance is assigned to the cluster with the least deviation (or highest similarity) i.e., $$\rho(e) = \underset{g \in \{1, \ldots, k\}}{\operatorname{argmin}} d(x(e), \hat{x}_g).$$

Case 2: The test instance set is a subset of the instance pool used for clustering, i.e., $\epsilon_{test} \subset \epsilon$. In this case, the row clustering $\rho: \epsilon \mapsto \{1, \ldots, k\}$ learned as describe above is adequate to assign instances in $\epsilon_{test}$ to the instance clusters. The cluster feature vectors $\hat{x}_1, \ldots, \hat{x}_k$ are computed as before from the approximate data matrix $\hat{X}$.

Using the mapping of the test instances into the instance clusters, we approximate the query utility function $V_{new}$ in terms of the model predictions over the cluster feature vectors. Specifically, we define the utility of an unanswered query $q \in Q_{new}$ as $$V_{new}(q) = -E_{a(q) \sim p(a_{\theta^*}(q))} \left[ \sum_{g \in \{1, \ldots, k\}} m_g U(p_{\theta^*_{new}(q, a(q))}(y \mid \hat{x}_g)) \right],$$

where a(q), $\theta^*$, $\theta^*_{new}(q, a(q))$, U(•) are as defined previously above, $\hat{x}_g$ is the feature vector associated with the $g^{th}$ instance cluster and $m_g = |\{e \in \epsilon_{test} | \rho(e) = g\}|$ is the cardinality of the $g^{th}$ instance cluster in the test set.

When the instance clusters are fairly homogeneous, the predicted class probabilities for the individual instances in a cluster are likely to be close to the class predictions over the cluster feature vector. Weighting these predictions over the cluster feature vector by the cluster population ensures a fair representation of the test population. Hence, for a good clustering of test instances, the new query utility function $V_{new}(q)$ provides a reasonable approximation of the original utility function V(q) while only requiring prediction of class probabilities over k cluster feature vectors.

In summary, we provide an example of a method illustrating some primary steps in classifier development in accordance with an aspect.

Input: instance pool $\epsilon$, feature pool $\mathcal{F}$, test instance pool $\epsilon_{test}$, data matrix X, parametric family of conditional distributions $\{p_\theta(y|x) | \theta \in \Theta\}$, stopping criterion $h(\epsilon, \mathcal{F}, \epsilon_{test}, X, S, \theta)$;
Output: parametric classifier $p_{\theta^*}(y|x)$ Method:
Initialization
Initialize the classifier parameters $\theta^{(0)}$
Construct the valid query pool $Q_{valid} = Q$ based on $\epsilon$, $\mathcal{F}$, and X
Available supervision $S = \emptyset$
repeat
Query Scoring
Compute the utility score $V_{\theta^t, \epsilon_{test}}(q)$ for each $q \in Q_{valid}$
Choose the best query (or top-k queries)

$$q^{(t)} \leftarrow \underset{q \in Q_{valid}}{\operatorname{argmax}} V_{\theta^{(t)}, \epsilon_{test}}(q)$$

Editorial Feedback
Editor provides response $a(q^{(t)})$ to the query $q^{(t)}$.
Weight vector $W_q^{(t)}$ and distortion measure $d_q^{(t)}$ are either per query or determined using editor specified default rules and cross-validation techniques
Model Learning
Available supervision $S \leftarrow S \cup \{(q^{(t)}, a(q^{(t)}))\}$
Valid query pool $Q_{valid} \leftarrow Q_{valid} \backslash \{q^{(t)}\}$
Determine the parameters $\theta^{(t)}$ that optimize the classifier quality criterion, i.e., $$\theta^{(t)} \leftarrow \underset{\theta \in \Theta}{\operatorname{argmax}} J_{\epsilon, \mathcal{F}, X, S}(\theta)$$

where J(•) is described as set forth above and the optimization procedure is either based on batch learning over entire S or follows an incremental procedure as described above.
until stopping criterion h is achieved
return $\theta^* = \theta^{(t)}$ We have thus described a classifier development process to seamlessly and intelligently integrate different forms of human feedback into the data preparation, learning and evaluation stages.

Figure 5:
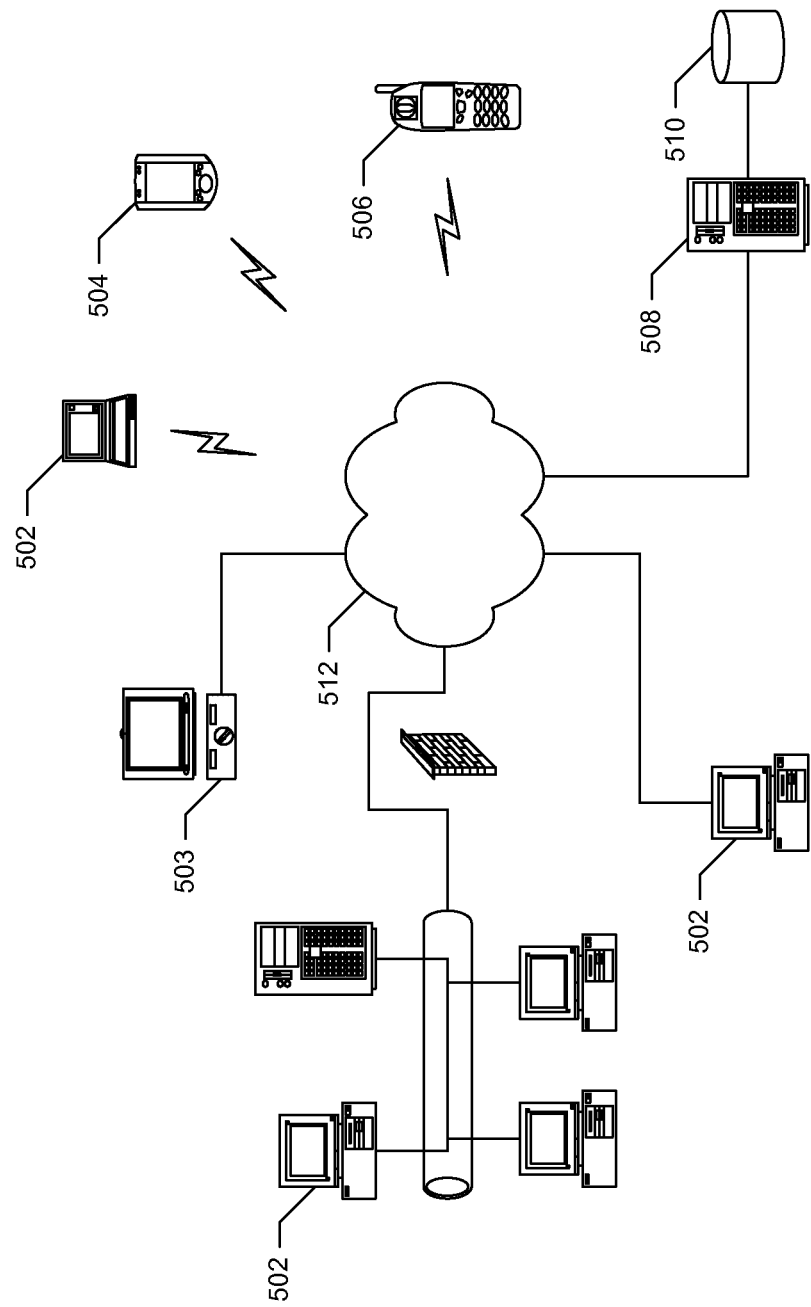
FIG. 5 is a simplified diagram of a network environment in which specific embodiments of the present invention may be implemented.

Embodiments of the present invention may be employed to facilitate implementation of binary classification systems in any of a wide variety of computing contexts. For example, as illustrated in FIG. 5, implementations are contemplated in which the classification model learning system may be implemented as a computing device, executing computer instructions, operating within a diverse network environment via any type of computer (e.g., desktop, laptop, tablet, etc.) 502, media computing platforms 503 (e.g., cable and satellite set top boxes and digital video recorders), handheld computing devices (e.g., PDAs) 504, cell phones 506, or any other type of computing or communication platform.

According to various embodiments, applications of such instructions may be executed locally, remotely or a combination of both. The remote aspect is illustrated in FIG. 5 by server 508 and data store 510 which, as will be understood, may correspond to multiple distributed devices and data stores.

The various aspects of the invention may be practiced in a wide variety of environments, including network environment (represented, for example, by network 512) including, for example, TCP/IP-based networks, telecommunications networks, wireless networks, etc. In addition, the computer program instructions with which embodiments of the invention are implemented may be stored in any type of tangible computer-readable media, and may be executed according to a variety of computing models including, for example, on a stand-alone computing device, or according to a distributed computing model in which various of the functionalities described herein may be effected or employed at different locations.

The following references have been referred to in the text above:

[1] A. Banerjee, I. Dhillon, J. Ghosh, S. Merugu, and D. Modha. A generalized maximum entropy approach to Bregman co-clustering and matrix approximation. JMLR, 2007. to appear.
[2] S. Basu, A. Banerjee, and R. J. Mooney. Active semi-supervision for pairwise constrained clustering. In SDM, 2004.
[3] C. Bishop. Pattern Recognition and Machine Learning. Springer, 2006.
[4] S. Boyd and L. Vandenberghe. Convex Optimization. Cambridge University Press, 2004.
[5] Y. Censor and S. Zenios. Parallel Optimization: Theory, Algorithms, and Applications. Oxford University Press, 1998.
[6] NOT USED.
[7] D. A. Cohn, Z. Ghahramani, and M. I. Jordan. Active learning with statistical models. J. Artif. Intell. Res. (JAIR), 4:129-145, 1996.
[8] S. Godbole, A. Harpale, S. Sarawagi, and S. Chakrabarti. Document classification through interactive supervision of document and term labels. In PKDD, pages 185-196, 2004.
[9] I. Guyon and A. Elisseeff. An introduction to variable and feature selection. J. Mach. Learn. Res., 3:1157-1182, 2003.
[10] D. D. Lewis and J. Catlett. Heterogeneous uncertainty sampling for supervised learning. In Proceedings of the Eleventh International Conference on Machine Learning, pages 148-156. Morgan Kaufmann, 1994.
[11] D. J. C. Mackay. Information-based objective functions for active data selection. Neural Computation, 4:590-604, 1992.
[12] S.C. Madeira and A. L. Oliveira. Biclustering algorithms for biological data analysis: A survey. IEEE Trans. Computational Biology and Bioinformatics, 1(1):24-45, 2004.
[13] G. S. Mann and A. McCallum. Simple, robust, scalable semi-supervised learning via expectation regularization. In ICML, pages 593-600, 2007.
[14] H. Raghavan, O. Madani, and R. Jones. Active learning with feedback on features and instances. Journal of Machine Learning Research, 7:1655-1686, 2006.
[15] H. S. Seung, M. Opper, and H. Sompolinsky. Query by committee. In COLT, pages 287-294, 1992.
[16] S. Tong. Active learning: theory and applications. PhD thesis, Stanford University, 2001.

What is claimed is:

1. A computer-implemented method of training a classifier, such that the trained classifier is configured to map an instance to one of a plurality of classes, comprising:
providing a query space, wherein each of a plurality of queries of the query space is associated with a subset of a plurality of instances and a subset of a plurality of features, where each of the plurality of queries of the query space includes a relevant characteristic function that describes, for that query, a function of instance-feature values associated with that query and of instance-class probabilities associated with that query, wherein the instance-class probabilities are an indication of a probabilistic model of mapping of the instances associated with the query to at least one of the plurality of classes, the query space tangibly embodied in a computer-readable medium;
for each of the plurality of queries, applying a query utility function to determine a query utility value for that query;
based, at least in part, upon the query utility value determined for each of the plurality of queries, identifying one or more queries of the plurality of queries to be presented for editorial feedback;
operating a computing device to present the identified queries and receive an indication of commentary from at least one editor for each of the identified one or more queries of the plurality of queries;
maintaining a classifier framework tangibly embodied in a computer-readable medium, the classifier framework configured to provide class probabilities for the instances according to a tunable parameter vector;
operating a computing device to determine a distortion value for the identified queries by applying a distortion function to a deviation of the classifier framework response from the indication of editorial commentary for that query; and
operating a computing device to adjust the tunable parameter vector based on a cost function that considers a regularization component and the distortion values over the queries for which the editors gave commentary.

2. The method of claim 1, wherein: for at least some, but not all, of the plurality of queries, at least one of the subset of instances and the subset of features is a null set.

3. The method of claim 1, wherein:
the commentary includes, for each of at least some of the queries, a relative importance score for the query, the relative importance score indicating a relative importance of the query; and
the distortion value for each of at least some of the queries is weighted by the relative importance score for that query.

4. The method of claim 1, wherein: the distortion function for at least some of the queries is different from the distortion functions for other queries.

5. The method of claim 4, wherein: the distortion function associated with a query is determined by the choice of relevant characteristic function made for the query.

6. The method of claim 1 wherein:
the distortion value for each of at least some of the queries is weighted by a relative importance score for that query; and
the relative importance score of a query is the same for all queries which share the same relevant characteristic function.

7. The method of claim 1, wherein the query utility value comprises an expected reduction in uncertainty of model predictions over the plurality of instances.

8. The method of claim 7, wherein applying the query utility function comprises determining an expected reduction in uncertainty of model predictions over the plurality of instances.

9. The computer-implemented method of claim 1, wherein the commentary for each identified query being the editor's estimate of a value of the relevant characteristic function for that query.

10. The computer-implemented method of claim 1, wherein the plurality of queries are unanswered queries.

11. The computer-implemented method of claim 1, wherein at least one of the identified queries requests an indication of a class purity of the corresponding subset of instances or relevance of specific features to classification.

12. The computer-implemented method of claim 1, wherein each of the plurality of queries is designed for presentation to at least one editor for editorial commentary.

13. The computer-implemented method of claim 1, wherein the indication of commentary indicates an answer to the corresponding one of the identified queries.

14. A computer program product comprising at least one non-transitory computer readable medium having computer program instructions tangibly embodied thereon, the computer program instructions to configure at least one computing device to train a classifier such that the trained classifier is configured to map an instance to one of a plurality of classes, the computer program instructions, when executed by a processor, causing the processor to perform steps, comprising:

determining, from a plurality of instances that each have corresponding features of a plurality of features, clusters of instances that are homogeneous with respect to dependency of instance class assignments on the instance-feature values;

constructing a reduced query space from a query space based on the determined clusters, the query space including a plurality of queries, each of the plurality of queries being associated with a subset of the plurality of instances and a subset of the plurality of features, wherein the reduced query space includes a second plurality of queries, the second plurality of queries including a subset of the plurality of queries;

approximating a query utility function using the determined clusters;

for each of the second plurality of queries, applying the query utility function to determine a query utility value for that query;

based, at least in part, upon the query utility value determined for each of the second plurality of queries, identifying one or more queries of the second plurality of queries to be presented for editorial feedback;

operate a computing device to present the identified queries and receive an indication of commentary from at least one editor for each of the identified queries;

maintain a classifier framework tangibly embodied in a computer-readable medium, the classifier framework configured to provide class probabilities for the instances according to a tunable parameter vector;

determine a distortion value for each of the identified queries by applying a distortion function to a deviation of the classifier framework response from the indication of editorial commentary for that query; and adjust the tunable parameter vector based on a cost function that considers a regularization component and the distortion values over the queries for which the editors gave commentary.

15. The computer program product of claim 14, wherein: the distortion value for each of at least some of the queries is weighted by a relative importance score for that query.

16. The computer program product of claim 15 wherein: the relative importance score of a query is the same for all queries which share the same relevant characteristic function.

17. The computer program product of claim 14, wherein:
the commentary includes, for each of at least some of the queries, a relative importance score for the query indicating a relative importance of the query;
wherein the distortion value for at least some of the queries is weighted by the relative importance score for that query.

18. The computer program product of claim 14, wherein: the distortion function associated with a query is determined by the choice of relevant characteristic function made for the query.

19. The computer program product of claim 14, the commentary for each identified query being the editor's estimate of the true value of a relevant characteristic function for that query.

20. The computer program product of claim 14, wherein applying the utility function is not performed for queries in the plurality of queries that are not in the second plurality of queries.

21. The computer program product of claim 14, wherein approximating the utility function is further performed using a set of test instances, wherein the set of test instances includes at least one of: an instance in the plurality of instances or an instance that is not in the plurality of instances.

22. The computer program product of claim 14, where each of the plurality of queries of the query space comprises a relevant characteristic function that describes, for that query, a function of instance-feature values associated with that query and of instance-class probabilities associated with that query, wherein the instance-class probabilities are an indication of a probabilistic model of mapping of the instances associated with the query to at least one of the plurality of classes.

23. A computer program product comprising at least one non-transitory computer readable medium having computer program instructions tangibly embodied thereon, the computer program instructions to configure at least one computing device to train a classifier such that the trained classifier is configured to map an instance to one of a plurality of classes, the computer program instructions, when executed by a processor, causing the processor to perform steps, comprising:

providing a query space, wherein each of a plurality of queries of the query space pertains to a subset of a plurality of instances and a subset of a plurality of features, and wherein each of the plurality of queries of the query space includes a relevant characteristic function that describes, for that query, a function of instance-feature values associated with that query and of instance-class probabilities associated with that query, wherein the instance-class probabilities are an indication of a probabilistic model of mapping of the instances associated with the query to at least one of the plurality of classes, the query space tangibly embodied in a computer-readable medium;

for each of the plurality of queries, applying a query utility function to determine a query utility value for that query;

based, at least in part, upon the query utility value determined for each of the plurality of queries, identifying one or more queries of the plurality of queries to be presented for editorial feedback;

operating a computing device to present the identified queries and receive an indication of commentary from at least one editor for each of the identified one or more queries of the plurality of queries;

maintaining a classifier framework tangibly embodied in a computer-readable medium, the classifier framework configured to provide class probabilities for the instances according to a tunable parameter vector;

operating a computing device to determine a distortion value for the identified queries by applying a distortion function to a deviation of the classifier framework response from the indication of editorial commentary for that query; and operating a computing device to adjust the tunable parameter vector based on a cost function that considers a regularization component and the distortion values over the queries for which the editors gave commentary.

* * * * *